United States Patent
Oyanagi et al.

(10) Patent No.: US 7,778,989 B2
(45) Date of Patent: Aug. 17, 2010

(54) FILE MANAGEMENT APPARATUS

(75) Inventors: Makoto Oyanagi, Matsumoto (JP); Reiko Nomura, Azumino (JP)

(73) Assignee: Seiko Epson Corporation, Tokyo (JP)

(*) Notice: Subject to any disclaimer, the term of this patent is extended or adjusted under 35 U.S.C. 154(b) by 299 days.

(21) Appl. No.: 11/784,255

(22) Filed: Apr. 5, 2007

(65) Prior Publication Data

US 2007/0239795 A1 Oct. 11, 2007

(30) Foreign Application Priority Data

Apr. 6, 2006 (JP) ............................... 2006-104781

(51) Int. Cl.
*G06F 7/00* (2006.01)
*G06F 17/30* (2006.01)
(52) U.S. Cl. .................. 707/705; 707/706; 707/735; 707/758; 707/999.1; 707/999.2
(58) Field of Classification Search ............. 707/1, 707/705, 706, 736, 737, 758, 999.1–999.3
See application file for complete search history.

(56) References Cited

U.S. PATENT DOCUMENTS

| | | | |
|---|---|---|---|
| 6,714,209 B2* | 3/2004 | Van Valer | 345/629 |
| 7,225,221 B2 | 5/2007 | Ohashi | |
| 7,249,124 B2 | 7/2007 | Sasaki | |
| 2002/0154127 A1* | 10/2002 | Vienneau et al. | 345/473 |
| 2004/0027624 A1* | 2/2004 | Parulski et al. | 358/527 |
| 2007/0073751 A1* | 3/2007 | Morris et al. | 707/101 |
| 2007/0239948 A1* | 10/2007 | Muraki et al. | 711/162 |

FOREIGN PATENT DOCUMENTS

| | | |
|---|---|---|
| JP | 2000-315209 | 11/2000 |
| JP | 2002-183174 | 6/2002 |
| JP | 2003-256466 | 9/2003 |
| JP | 2004-171053 | 6/2004 |

OTHER PUBLICATIONS

Mathis et al., "A Metadata Model for Electronic Images", IEEE, Proceedings of the 38th Hawaii International Conference on System Sciences, 2005, pp. 1-10. Download: http://ieeexplore.ieee.org/stamp/stamp.jsp?tp=&arnumber=1385464.*

* cited by examiner

*Primary Examiner*—John E Breene
*Assistant Examiner*—Hares Jami
(74) *Attorney, Agent, or Firm*—Nutter McClennen & Fish LLP; John J. Penny, V (57) ABSTRACT

A file management apparatus includes the following elements: a first non-volatile storage medium that holds a metadata group including a plurality of pieces of metadata corresponding to a predetermined file type; a detector that detects a file of the predetermined file type; a metadata guide unit that introduces, as selection options, the plurality of pieces of metadata included in the metadata group corresponding to the predetermined file type of the detected file; a metadata selection unit that accepts selection of at least one piece of the introduced metadata; and a management data storage unit that stores the selected metadata in association with the detected file in a second non-volatile storage medium in which the detected file is stored.

7 Claims, 7 Drawing Sheets

| ID NO. | FILE NAME | PATH | SIZE | CREATION TIME AND DATE | CATEGORY |
|---|---|---|---|---|---|
| 001 | xxx005 | B: \xxx | xxxx | xxxxxxxx | – |
| 002 | xxx006 | B: \xxx | xxxx | xxxxxxxx | – |
| 003 | xxx007 | B: \xxx | xxxx | xxxxxxxx | – |

FIG. 7

FIG. 8

FILE MANAGEMENT APPARATUS

This application is based on Japanese Patent Application No. 2006-104781 filed on Apr. 6, 2006, in Japanese Patent Office, the entire content of which is hereby incorporated by reference.

BACKGROUND

1. Technical Field

The present invention relates to file management apparatuses, and more particularly to processing of metadata for managing files.

2. Related Art

The storage capacity of computer-related devices is increasing every year, and each user owns a significant number of files. Metadata is helpful in searching for a desired file from among many files. In particular, metadata is useful in managing image files and audio files that cannot be detected by text search for searching for files containing specific contents.

On the other hand, it is bothersome to enter metadata for individual files, and hence the actual use of metadata in searching for image files and audio files is limited to automatically-set metadata, such as file creation time and date, file creator, and the like. In the case of electronic apparatuses that have difficulty in entering text, the user cannot manage files by entering metadata. An exemplary apparatus is described in JP-A-2004-171053.

SUMMARY

An advantage of some aspects of the invention is that it facilitates file management using metadata.

A file management apparatus according to an aspect of the invention includes the following elements: a first non-volatile storage medium that holds a metadata group including a plurality of pieces of metadata corresponding to a predetermined file type; a detector that detects a file of the predetermined file type; a metadata guide unit that introduces, as selection options, the plurality of pieces of metadata included in the metadata group corresponding to the predetermined file type of the detected file; a metadata selection unit that accepts selection of at least one piece of the introduced metadata; and a management data storage unit that stores the selected metadata in association with the detected file in a second non-volatile storage medium in which the detected file is stored.

According to the file management apparatus, a user can set metadata for a detected file by selecting a specific piece of metadata from among a plurality of pieces of metadata corresponding to the file type of the detected file. This facilitates file management using metadata according to the contents of files. For example, typical contents of image files and audio files are different. More specifically, image files can be categorized by photograph subject or circumstance, such as family, child, trip, and friend, and audio files can be classified by genre, such as classical music, jazz, and rock. Data indicating each concept or name that is generally or universally used in categorizing the contents of files is held in advance as metadata in association with the file type in a non-volatile storage medium, and metadata corresponding to each file to be processed is introduced to the user. In this manner, a user-friendly human machine interface (HMI) that can set metadata to each file to be processed simply by introducing pieces of metadata corresponding to files and allowing the user to select a desired piece of metadata is implemented.

In this case, the first non-volatile storage medium may hold a plurality of metadata groups corresponding to different file types. According to the file management apparatus, metadata corresponding to a plurality of file types can be easily managed.

In this case, the management data storage unit may store the selected metadata in association with the detected file in the second non-volatile storage medium by editing a metafile for managing reference to files and corresponding metadata. According to the file management apparatus, metadata for a plurality of files is described in a metafile for managing reference to the files. Thus, the processing speed of detecting a desired file using metadata as a key can be increased.

In this case, the management data storage unit may describe the metafile in Extensible Markup Language (XML). According to the file management apparatus, the metafile is highly versatile. Therefore, metadata described by the file management apparatus can be used in many electronic apparatuses.

The file management apparatus may further include a file guide unit that introduces detected files as selection options, and a file selection unit that accepts selection of at least one of the introduced files. In the case that a plurality of files are selected, the management data storage unit may store the selected metadata in association with the selected files in the second non-volatile storage medium. According to the file management apparatus, metadata can be set to a plurality of files. Therefore, user operations become easier.

The file management apparatus may further include a copy unit that copies the selected file to the second non-volatile storage medium. According to the file management apparatus, metadata can be set at the time a file is copied.

The file guide unit may introduce a file that has not been stored in the second non-volatile storage medium as a selection option. According to the file management apparatus, an improper operation of copying again the same file to the same storage medium is avoided. Also, the burden on the user to pay attention to avoid such an improper operation is lessened.

The file guide unit may introduce all the detected files as selection options in the case that the files are to be introduced as selection options for the first time after the file management apparatus has entered a predetermined mode, and, in the case that the files are to be introduced as selection options for the second time and onward after the file management apparatus has entered the predetermined mode, the file guide unit may introduce a file that has not been stored in the second non-volatile storage medium after the file management apparatus has entered the predetermined mode as a selection option. According to the file management apparatus, an improper operation of copying again the same file to the same storage medium can be avoided without needing to access the second non-volatile storage medium. Also, the burden on the user to pay attention to avoid such an improper operation is lessened.

Every time one piece of metadata is selected, the copy unit may copy the selected file to the second non-volatile storage medium. In the case that the copied file does not match a file to which metadata has been set, the user may be confused about which file to copy and to which file metadata is to be set. According to the file management apparatus, a group of copied files is equivalent to a group of files to which metadata has been set. Therefore, an operation of copying many files and setting metadata becomes easier.

A file management method according to another aspect of the invention includes detecting a file of a file type corresponding to a metadata group held in a first non-volatile storage medium; introducing, as selection options, a plurality of pieces of metadata included in the metadata group corresponding to the file type of the detected file; accepting selection of at least one piece of the introduced metadata; and storing the selected metadata in association with the detected file in a second non-volatile storage medium in which the detected file is stored. According to the file management method, a user can select a desired piece of metadata from among a plurality of pieces of metadata corresponding to a file type of a detected file. This facilitates file management using metadata according to the contents of files.

A file management program according to another aspect of the invention allows a computer to function as the following elements: a detector that detects a file of a file type corresponding to a metadata group held in a first non-volatile storage medium; a metadata guide unit that introduces, as selection options, a plurality of pieces of metadata included in the metadata group corresponding to the file type of the detected file; a metadata selection unit that accepts selection of at least one piece of the introduced metadata; and a management data storage unit that stores the selected metadata in association with the detected file in a second non-volatile storage medium in which the detected file is stored. According to the file management program, a user can select a desired piece of metadata from among a plurality of pieces of metadata corresponding to a file type of a detected file. This facilitates file management using metadata according to the contents of files.

The functions of the elements according to the aspects of the invention are implemented by hardware resources whose functions are specified by the structure, hardware resources whose functions are specified by a program, or a combination thereof. The functions of the elements are not limited to those implemented by hardware resources that are physically independent of one another.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described with reference to the drawings.

1. Structure of File Management Apparatus

Figure 2:
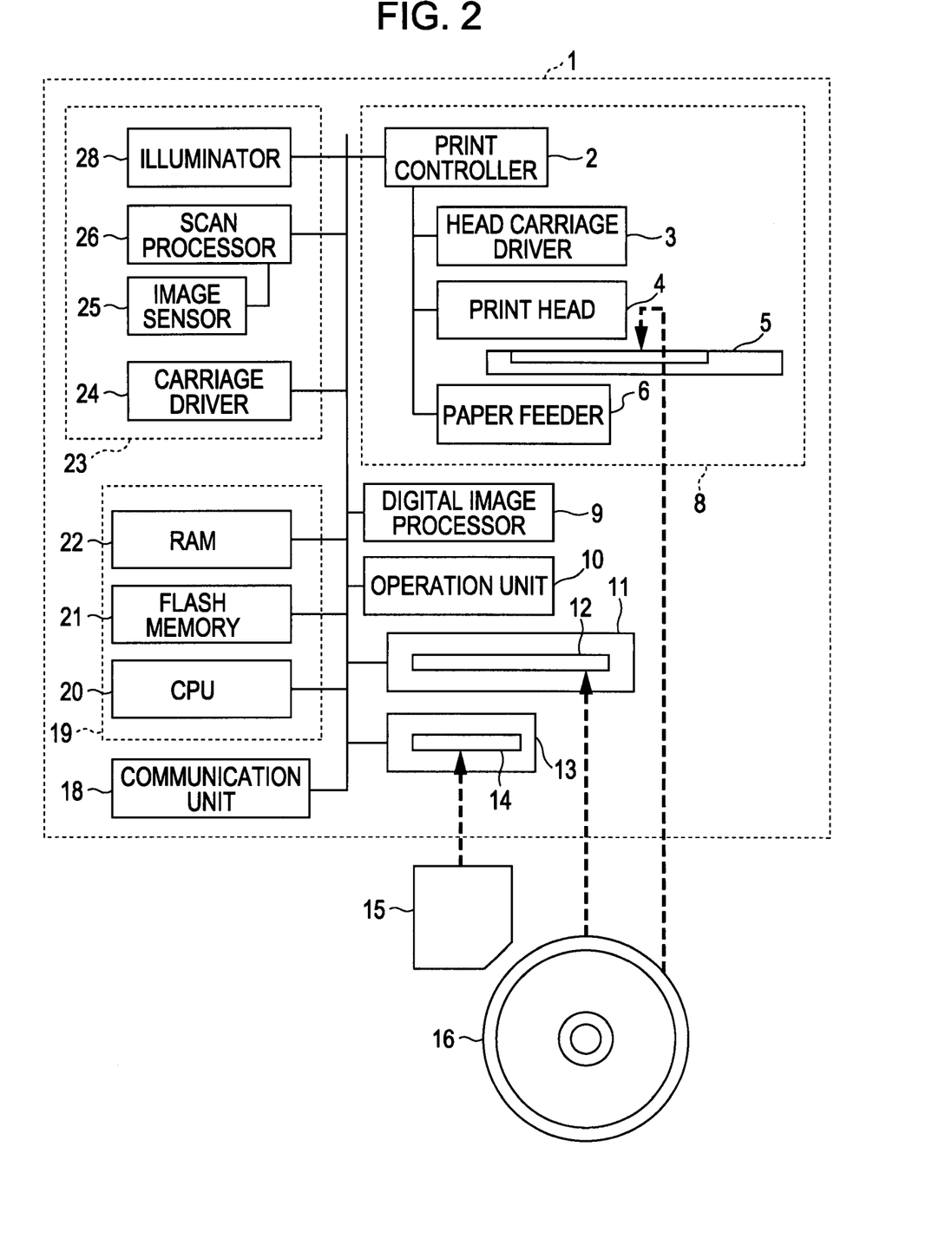
FIG. 2 is a block diagram of the structure of a multifunction printer serving as an exemplary file management apparatus according to the embodiment.

FIG. 2 is a block diagram of the structure of a multifunction printer (MFP) 1 serving as an exemplary file management apparatus according to an embodiment of the invention. The MFP 1 has a print function of printing an image on the basis of image data input from a removable memory, such as a card-type flash memory 15 or an optical disk 16, a personal computer (PC), a cellular phone, or a personal digital assistant (PDA) (all of which are not shown), a copy function, and a data backup function of backing up data from the card-type flash memory 15 to the optical disk 16.

A scan unit 23 includes an illuminator 28, an image sensor 25, a scan processor 26, a carriage driver 24, and the like. The image sensor 25 outputs an electrical signal regarding the shade level of an optical image of a document illuminated by the illuminator 28 and formed by an imaging optical system (not shown) on a light receiving surface. The scan processor 26 drives the image sensor 25, converts the analog signal output from the image sensor 25 into a digital signal, and outputs the digital signal to a random-access memory (RAM) 22. The carriage driver 24 drives the image sensor 25 or the imaging optical system to move back and forth orthogonally to a main scanning direction.

A print unit 8 includes an ink jet print head 4, a head carriage driver 3, a paper feeder 6, a print controller 2 controlling these elements, and the like. On the basis of print data stored in the RAM 22, the print controller 2 allows the paper feeder 6 to transport a sheet of paper orthogonally to the axis of a direction in which the print head 4 moves, allows the head carriage driver 3 to move the print head 4 back and forth orthogonally to the direction in which the sheet is transported, and allows the print head 4 to eject ink, thereby forming an image on the sheet. The print controller 2 allows the paper feeder 6 to transport a disk tray 5 orthogonally to the axis of the direction in which the print head 4 moves, and allows the print head 4 to eject ink toward the optical disk 16 mounted on the disk tray 5, thereby printing an image on the optical disk 16.

A digital image processor 9 is a dedicated processor, such as a digital signal processor (DSP), which executes, in cooperation with a central processing unit (CPU) 20, image processing such as resolution conversion, unsharpening, tone level correction, binarization, and separation, and generates print data from image data to be printed.

A card memory interface 13, which corresponds to a copy unit, is connected to the card-type flash memory 15 inserted from a card slot 14. The card memory interface 13 reads data from the card-type flash memory 15 and transfers the read data to the RAM 22. The card memory interface 13 writes data transferred from the RAM 22 to the card-type flash memory 15.

An optical disk interface 11 is connected to the optical disk 16 inserted from a disk slot 12. The optical disk interface 11 reads data from the optical disk 16 and transfers the read data to the RAM 22. The optical disk interface 11 writes data transferred from the RAM 22 to the optical disk 16. Available optical disks include a compact disc (CD), a compact disc-recordable (CD-R), a compact disc rewritable (CD-RW), a digital versatile disc recordable (DVD-R), a DVD-RW, and a DVD-RAM. Since the embodiment is targeted at media that can be written, the optical disk interface 11 conforms to specifications including CD-R, CD-RW, DVD-R, DVD-RW, and DVD-RAM.

According to the embodiment, the optical disk 16 corresponds to a second non-volatile storage medium, and the optical disk interface 11 corresponds to a copy unit. The case in which data stored in the card-type flash memory 15 is copied to the optical disk 16 will be described by way of example. However, there are no particular limitations on the type of a non-volatile storage medium serving as a copy source and the type of a non-volatile storage medium serving as a copy destination. The copying of data is not an essential element of the invention. Metadata regarding data stored in a non-volatile storage medium may be additionally stored in the non-volatile storage medium.

A communication unit 18 is a communication interface for allowing a controller 19 to communicate with an external system, such as a PC, a cellular phone, or a PDA. The communication unit 18 communicates with the external system via a local area network (LAN), the Internet, a universal serial bus (USB), or the like. An interface with an external storage medium, such as the card-type flash memory 15 or the optical disk 16, may be a separate device independent of the MFP 1 and may be connected to the MFP 1 via the communication unit 18.

The controller 19 includes the RAM 22, a flash memory 21, and the CPU 20. The CPU 20 executes a control program stored in the flash memory 21 to control the elements of the MFP 1. The flash memory 21, which corresponds to a first non-volatile storage medium, is a non-volatile memory that stores the control program. A metadata group constitutes part of the control program. The RAM 22 is a volatile memory that temporarily stores image data and a control program input from the card memory interface 13, the communication unit 18, or the scan unit 23. The control program may be supplied via a network from a remote server or via a computer-readable recording medium, such as a removable memory, and may be stored in the flash memory 21. The controller 19 executes the control program to function as a detector, a metadata guide unit, a metadata selection unit, a management data storage unit, a file guide unit, a file selection unit, and a copy unit.

Figure 3:
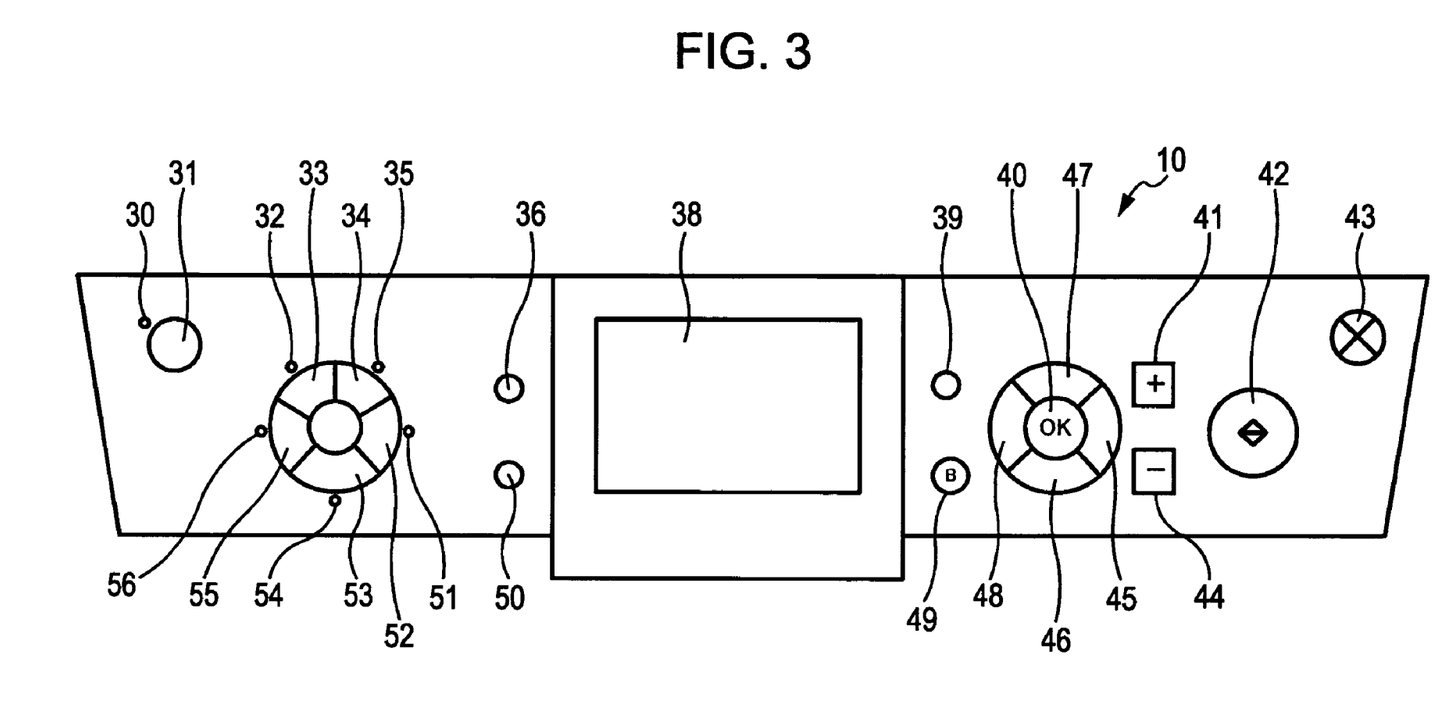
FIG. 3 is a plan view of an operation unit according to the embodiment.

An operation unit 10 includes an operation panel shown in FIG. 3, a graphic controller (not shown), and a button input interface circuit (not shown). A flat panel display (FPD) 38 constitutes a screen for displaying a screen image on the basis of screen data formed by the controller 19. Image data for implementing a graphical user interface (GUI) is referred to as "screen data". The operation panel includes a plurality of buttons for operating the MFP 1 and a plurality of indicators for indicating states of the MFP 1. More specifically, the buttons include the following: a power button 31; mode selection buttons 33, 34, 52, 53, and 55; a display switch button 36; a switch button 50 for switching the mode to a setup mode; a switch button 39 for switching the mode to a print setting mode; a back button 49 for inputting an instruction to return to a previous menu; buttons 45, 46, 47, and 48 constituting a cross key for performing menu operations; a confirm (OK) button 40 for confirming a selected menu option; buttons 41 and 44 for inputting instructions to increase and decrease the number of copies to be printed; a button 42 for inputting an instruction such as a print start instruction or a copy start instruction; and a button 43 for inputting a cancellation instruction.

2. Structure of Management Data

The MultiPhoto/Video (MPV) is a unified specification set forth by the Optical Storage Technology Association (OSTA) for enabling any device to access image data and audio data stored in a storage medium, regardless of a file system that is different for each device. The MPV specifies that the content title, path, and category indicating the contents of each file stored in a storage medium be described in an Extensible Markup Language (XML) metadata file (referred to as a "manifest"). Using a file system conforming to the MPV, for example, the structure of management data in the MFP 1 will be described below. Management data stored in a root directory of a storage medium is referred to as a "root manifest", and management data stored in each folder is referred to as a "sub-manifest".

Figure 4:
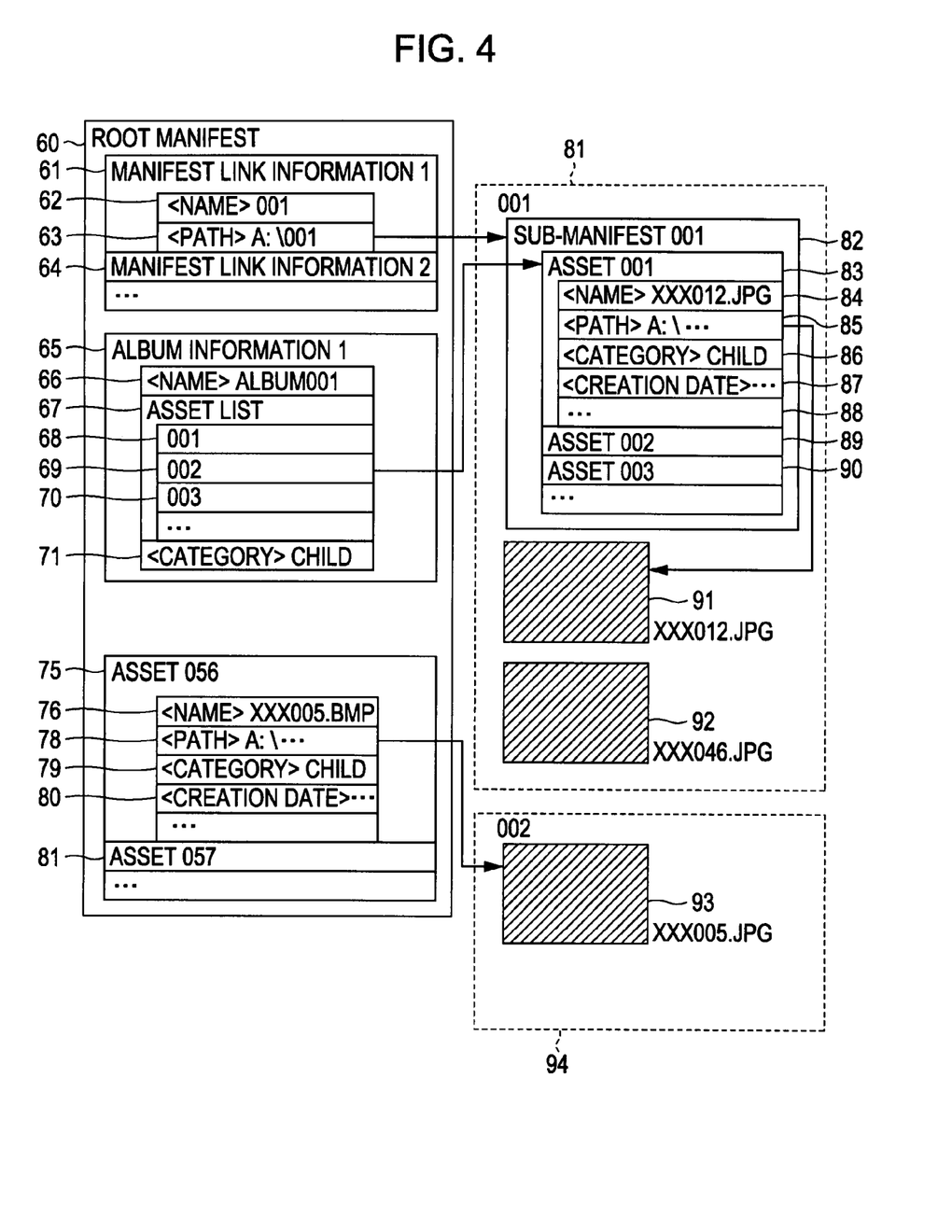
FIG. 4 is a schematic diagram of the structure of management data according to the embodiment.

FIG. 4 is a schematic diagram of the structure of management data. A manifest is a metafile including a data group under management thereof. Metadata described in the manifest is tagged in XML. In the manifest, asset information 75, 81, 83, 89, and 90, album information 65, manifest link information 61 and 64, and the like are described.

An asset is a unit of a target accessible to each device and corresponds to one or a plurality of files. Each asset is given a unique identifier within a storage medium. The asset information 75, 81, 83, 89, and 90 includes metadata such as names 76 and 84, paths 78 and 85, categories 79 and 86, and creation times and dates 80 and 88 of respective assets under management thereof.

An album is a set of one or a plurality of assets and generally corresponds to a plurality of files. The album information 65 is information for uniformly managing metadata of a plurality of files that may be organized into a group from a certain viewpoint. The album information 65 may include a name 66 and a category 71 representing a plurality of assets under management thereof. The album information 65 includes a list (asset list 67) of identifiers 68, 69, and 70 of a plurality of assets under management thereof.

A sub-manifest 82 is stored in the same folder as the asset under management thereof. Besides this point, there are no differences between the sub-manifest 82 and a root manifest 60. By storing the sub-manifest 82 in the same folder as the asset under management thereof, metadata can also be copied simply by copying the folder containing the data. This facilitates the data management.

The manifest link information 61 and 64 is information for establishing links to other manifests. The manifest link information 61 and 64 includes a name 62 and a path 63 to a linked manifest.

By storing the above-described root manifest 60 and the sub-manifest 82 in a storage medium, any MPV device is enabled to access and search assets stored in the storage medium. For example, all files in a specific category set as metadata can be detected by searching asset information using the category as a key.

The name or category of a file may represent the contents of the file. However, unlike its creation time and date, the contents of the file are not determined uniquely. In contrast, in the case of image files that are generated by a digital camera and that are in Joint Photographic Experts Group (JPEG), Moving Picture Experts Group (MPEG), bitmap (BMP), and Audio Video Interleave (AVI) formats, it is useful to regard categories of photograph subjects as categories of the files. Although various concepts for categorizing photograph subjects are available, a generally recognizable classification system may be defined for the photograph subjects. For example, for general objects serving as photograph subjects, such as families, children, friends, landscapes, plants, animals, and buildings, the contents of image files can be estimated from the nouns representing these objects. For events such as trips, athletic meets, Christmas and New Year parties, birthday parties, general parties, school enrollment ceremonies, and graduation ceremonies, the contents of image files can be estimated from the nouns representing these events.

In the case of audio files in MPEG, Waveform (WAV), Windows Media Audio (WMA), and the like, the genre of music may usefully serve as the category of each file. Many music genres are generally recognized. For example, the contents of audio files can be estimated from the genre names such as classical music, jazz, pops, rock, and folk music.

According to the embodiment, categories are set in advance according to each file type on the basis of the generally acceptable information classification system, and the categories are stored for each file type in the flash memory 21. A group of categories corresponding to one file type is referred to as a "category group". The category group corresponds to a metadata group.

The category group is managed in a database made up of records, each record including a display name for displaying a category as a menu item and an identifier that can uniquely specify the category. In the case that the display name is described as the category in a manifest, the display name serves as metadata of the file. In the case that the identifier is described as the identifier of the category in a manifest, the identifier serves as metadata of the file. In the case that a classification system having two or more layers is defined, it is preferable to describe a category group using a tree structure or a graph structure. By defining such a classification system having two or more layers, a GUI that clearly introduces many categories for one file type to a user can be implemented.

3. Operation of File Management Apparatus

The MFP 1 functions as a file management apparatus when operating in an album mode belonging to a fun print mode. The operation of the MFP 1 in the fun print mode will be described below.

Figure 1:
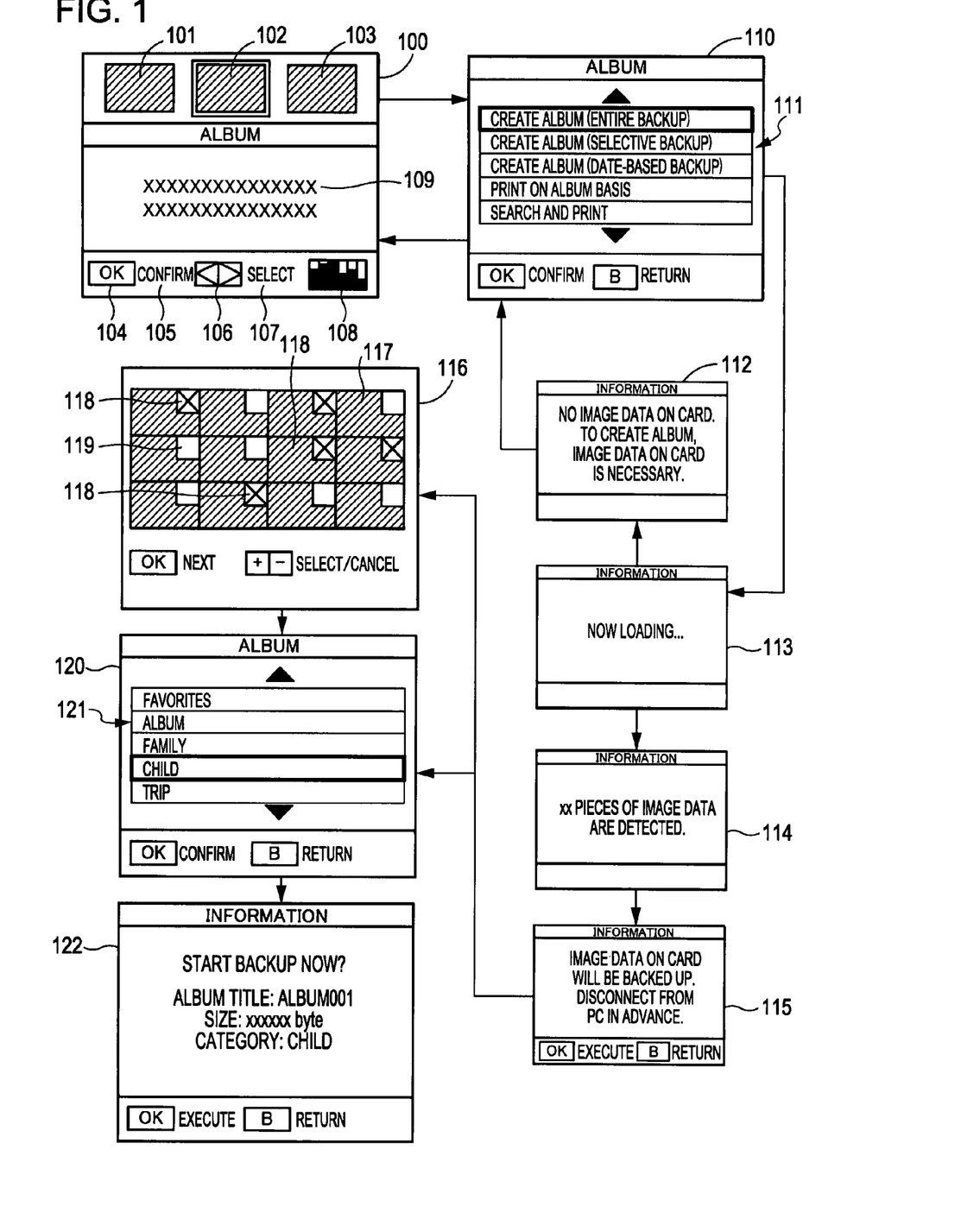
FIG. 1 is a transition diagram of a screen for describing an embodiment of the invention.
Figure 7:
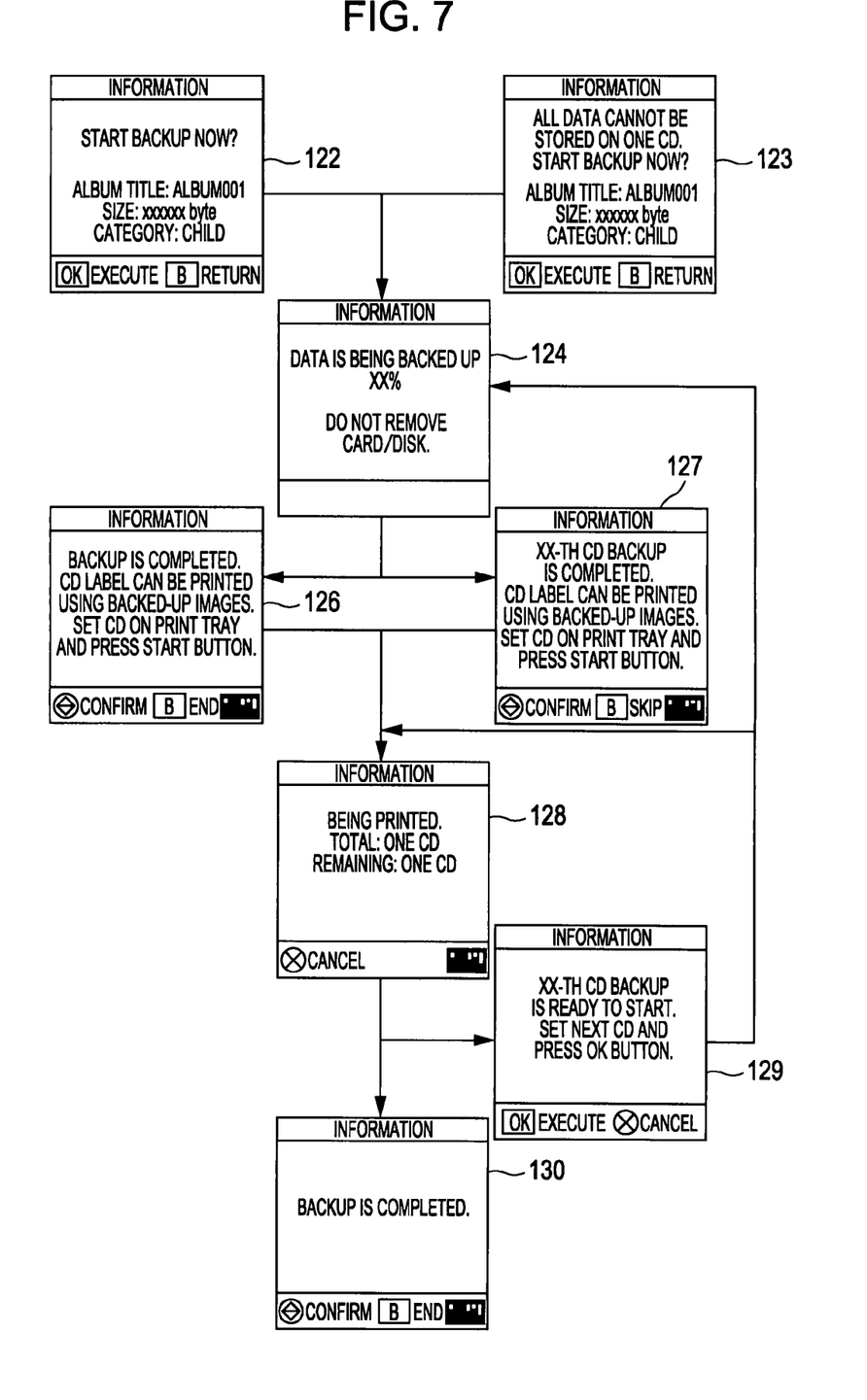
FIG. 7 is a transition diagram of a screen for describing the embodiment.

FIGS. 1 and 7 include transition diagrams of a screen in the fun print mode. A process described below is executed under control of the controller 19 executing a control program. Specifically, in the case that the mode selection button 53 for selecting the fun print mode is pressed, the indicator 54 is turned on, and a screen image 100 is displayed on the FPD 38. The screen image 100 constitutes a menu including a plurality of modes belonging to the fun print mode. Icons 101, 102, and 103 represent modes belonging to the fun print mode. In the case that one of the icons 101, 102, and 103 is selected by the buttons 45 and 48 constituting the cross key and the confirm button 40 is pressed, the mode is changed to a mode corresponding to the selected one of the icons 101, 102, and 103. Text 109 includes a sentence(s) for guiding the user to perform an operation. Icons 104 and 106 and text 105 and 107 show the relationships between a button and processing. An icon 108 is an indicator that indicates the amount of remaining ink.

In the case that the icon 102 corresponding to the album mode is selected and then the confirm button 40 is pressed, the mode is changed to the album mode, and a screen image 110 is displayed on the FPD 38. The album mode is a mode in which a plurality of image files stored in the card-type flash memory 15 or the optical disk 16 are processed collectively. The image screen 110 constitutes a menu 111 including processing options that can be executed in the album mode. In the album mode, the following first to fifth processing options are available:

1. All copy: All image files stored in the card-type flash memory 15 are copied to the optical disk 16;

2. Selective copy: From among the image files stored in the card-type flash memory 15, the user directly selects an image file(s) to copy, and the selected image file(s) is(are) copied to the optical disk 16;

3. Date-basis copy: The image files stored in the card-type flash memory 15 are copied into folders according to creation date on the optical disk 16.

4. Print album: From among the image files stored in the card-type flash memory 15 or the optical disk 16, an image file(s) managed as an album is printed.

5. Search and print: From among the image files stored in the card-type flash memory 15 or the optical disk 16, an image file(s) detected by a search using a category or a creation time and date as a key is(are) printed.

One of the options of the menu 111 is selected by the buttons 46 and 47 constituting the cross key. In the case that all copy, selective copy, or date-basis copy is selected and then the confirm button 40 is pressed, a screen image 113 is displayed for a while on the FPD 38. During the period in which the screen image 113 is displayed, the controller 19 searches for an image file(s) stored in the card-type flash memory 15 using the card memory interface 13. In the case that at least one image file is detected, the controller 19 creates a file list for managing an image file group of the detected image file(s).

Figure 5:
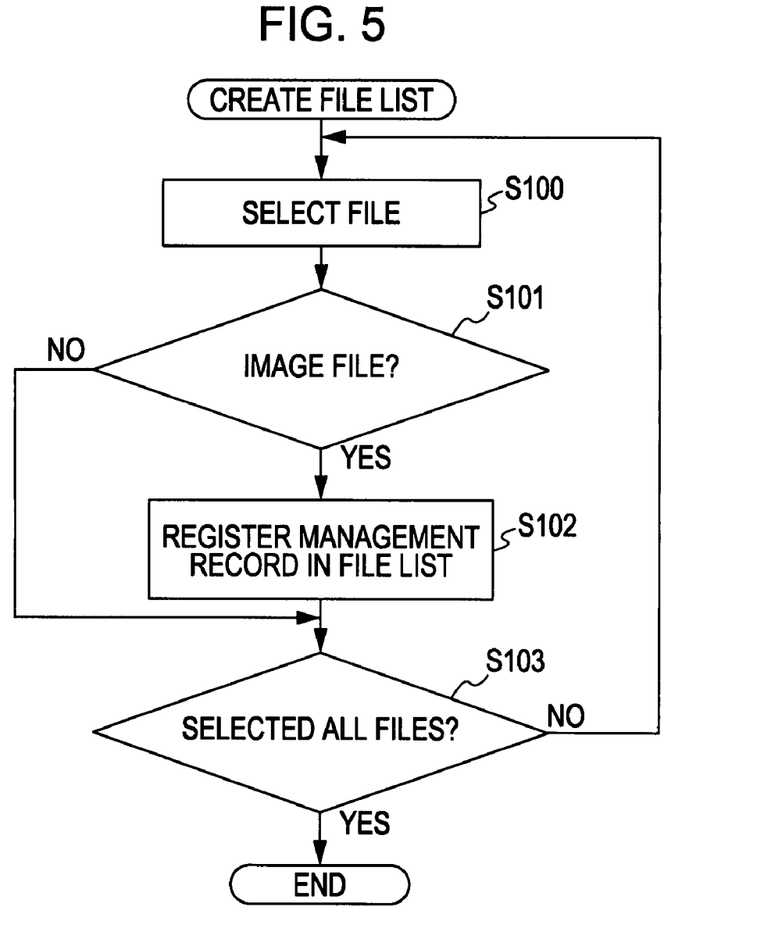
FIG. 5 is a flowchart of a process of creating a file list according to the embodiment.

FIG. 5 is a flowchart of a process of creating a file list. In step S100, one of the files stored in the card-type flash memory 15 is selected. In step S101, it is determined whether the selected file is an image file. More specifically, when the format of the selected file is one of JPEG, BMP, and Tagged Image File Format (TIFF), for example, the selected file is determined as an image file. If the determination is negative, the process proceeds to step S103.

Figure 6:
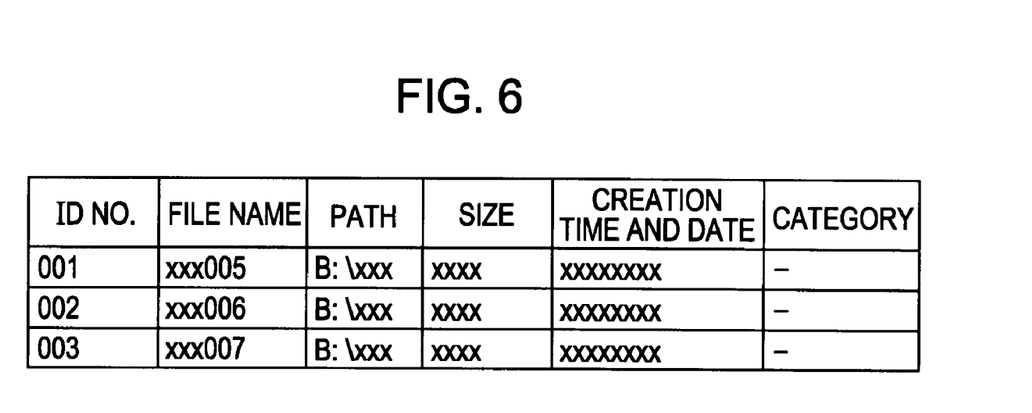
FIG. 6 is a data structural diagram of the file list according to the embodiment.

In step S102, a management record of the selected image file is registered in a file list. An exemplary file list is shown in FIG. 6. Each management record includes the identification number for sequentially selecting an image file, file name, path, size, creation time and date, category of the contents, and the like. In the case that a manifest is stored in the card-type flash memory 15, the controller 19 can obtain data to be registered as management data from the manifest.

In step S103, it is determined whether all the files stored in the card-type flash memory 15 have been selected. If the determination is negative, the process returns to step S100. If the determination is positive, the process of creating the file list ends. In the case that no image file is detected from the card-type flash memory 15, an image screen 112 for informing the user of the fact that no image data has been detected is displayed for a while on the FPD 38, and then the image screen 110 is displayed on the FPD 38 again.

In the case that at least one image file is detected from the card-type flash memory 15, a screen image 114 for informing the user of the cumulative number of detected image files is displayed on the FPD 38. When at least one image file is detected and the process of creating the file list ends, a screen image 115 for guiding the user to end the connection between the PC and the MFP 1 is displayed on the FPD 38. Such a guidance screen image is displayed because the card memory interface 13 and the optical disk interface 11 are accessible from the PC connected to the communication unit 18. In the case that the screen image 115 is displayed and the confirm button 40 is pressed, a screen image 116 is displayed on the FPD 38 during the selective copy processing, or a screen image 120 is displayed on the FPD 38 during the all copy processing or the date-basis copy processing.

The screen image 116 constitutes a menu for selecting files to copy. The image files detected from the card-type flash memory 15 are introduced to the user by image tiles 117 displayed on the basis of main image data or thumbnail image data stored in the detected image files. For each image tile 117, a check box 119 is displayed. By pressing the buttons 45, 46, 47, and 48 constituting the cross key, one of the image tiles 117 can be selected. In the case that one of the image tiles 117 is selected and the button 41 is pressed, the image file corresponding to the selected image tile 117 is selected as a file to copy, and a check mark 118 is displayed in the check box 119 of the selected image tile 117. In the case that the image tile 117 is selected and the button 44 is pressed, the image file corresponding to the selected image tile 117 is excluded from files to copy. In the case that at least one image tile 117 is selected and the confirm button 40 is pressed, the file(s) corresponding to the selected image tile(s) 117 is(are) confirmed as a file(s) to copy, and the screen image 120 is displayed on the FPD 38.

The screen image 120 constitutes a menu for selecting a category to be associated with all the files to copy. A category list 121 is displayed on the basis of a database of a category group stored in the flash memory 21. Since the image files detected from the card-type flash memory 15 are to be copied, the controller 19 obtains display names of a category group corresponding to the image files from the flash memory 21 and displays the list 121 on the basis of the obtained display names of the category group. As a result, categories constituting the category group are introduced to the user as category selection options to be associated with at least one file to be copied.

In the case that the screen image 120 is displayed on the FPD 38 and the buttons 46 and 47 constituting the cross key are pressed, one of the category display names is selected. In the case that the screen image 120 is displayed and the confirm button 40 is pressed, the identifier of a category corresponding to the selected display name is set as a category to be associated with at least one file to be copied, and a screen image 122 or a screen image 123 (see FIG. 7) is displayed on the FPD 38. At this point, the category is associated with each file to be copied. More specifically, for example, for all the files to be copied, the category is registered in corresponding category fields of the file list. Alternatively, the fact that a certain file is to be copied may be managed using the file list. For example, the file list may include a flag field indicating whether a certain file is to be copied. For a file confirmed to be copied, a corresponding flag may be turned on.

The screen image 122 is displayed in the case that the optical disk 16 set in the optical disk interface 11 has a sufficient free space to store all the files to be copied. The screen image 123 is displayed in the case that the total data amount of the files to be copied is greater than the free space of the optical disk 16 set in the optical disk interface 11. Each of the screen images 122 and 123 introduces the album name, the total data size of the files to be copied, and the set category.

In the case that the screen image 122 or the screen image 123 is displayed on the FPD 38 and the confirm button 40 is pressed, a root manifest and sub-manifests are edited on the basis of the file list, and a screen image 124 for indicating the progress state of copying is displayed on the FPD 38. In album information of the root manifest, the identifier of the category selected while the screen image 120 has been displayed is described. Note that the category may be described in asset information of each asset managed by the album information, or the category may be described in both the asset information and the album information or only in the asset information.

In the case that the screen image 122 or the screen image 123 is displayed on the FPD 38 and the confirm button 40 is pressed, the free space of the optical disk 16 is checked by the controller 19. In the case that the total data amount of the files to be copied is greater than the free space of the optical disk 16 set in the optical disk interface 11, a root manifest and sub-manifests of some of the files to be copied to the optical disk 16 set in the optical disk interface 11 are edited. More specifically, the controller 19 sequentially copies the files to be copied to the optical disk 16 while checking the free space of the optical disk 16. At the time the free space of the optical disk 16 becomes less than a predetermined space, the copying of the files to be copied is interrupted, and the root manifest and the sub-manifests are stored in the optical disk 16 set at that time. When the storage of the root manifest and the sub-manifests into the optical disk 16 is completed, the category selected while the screen image 120 has been displayed is stored into the optical disk 16 as metadata indicating the category of the contents of the files copied to the optical disk 16.

If the files to be copied are separately copied to multiple optical disks 16, when the copying to one optical disk 16 ends and the copying is interrupted, a screen image 127 is displayed on the FPD 38, and the optical disk 16 is ejected from the disk slot 12. While the screen image 127 is being displayed, it is possible to select a process to print information indicating the contents of, among the files to be copied, the image files that were copied to the optical disk 16 on a label of the optical disk 16, or to select to continue copying to another optical disk 16.

In the case that the screen image 127 is displayed and the back button 49 is pressed, it is selected to continue copying to another optical disk 16. The screen image 124 is displayed again on the FPD 38, and the above-described copying is resumed. Needless to say, in the case that the files to copy are copied to the second optical disk 16 and onward, the files that were already copied are excluded from the files to copy. When the storage of all the files to copy, the root manifest, and the sub-manifests into the optical disk(s) 16 is completed, a screen image 126 for indicating the completion to the user is displayed on the FPD 38.

On the screen image 126 displayed on the FPD 38 in the case that the copying of all the files to copy is completed and on the screen image 127 displayed on the FPD 38 in the case that the copying to one optical disk 16 is completed, it is introduced to the user that information indicating the contents of the image files copied to the optical disk 16 set in the optical disk interface 11 while the screen image 126 or 127 is being displayed can be printed.

In the case that the screen image 126 or the screen image 127 is displayed on the FPD 38 and the confirm button 40 is pressed, images printed on the basis of the copied image files and the category of the contents of the copied image files are printed on the label of the optical disk 16 as information indicating the contents of the image files copied to the optical disk 16. More specifically, a predetermined number of image files are selected from among the image files copied to the optical disk 16 immediately before the screen image 126 or the screen image 127 is displayed, and, on the basis of the selected image files and metadata of the selected image files, images shown in FIG. 8 are printed on a label 135 of the optical disk 16.

Figure 8:
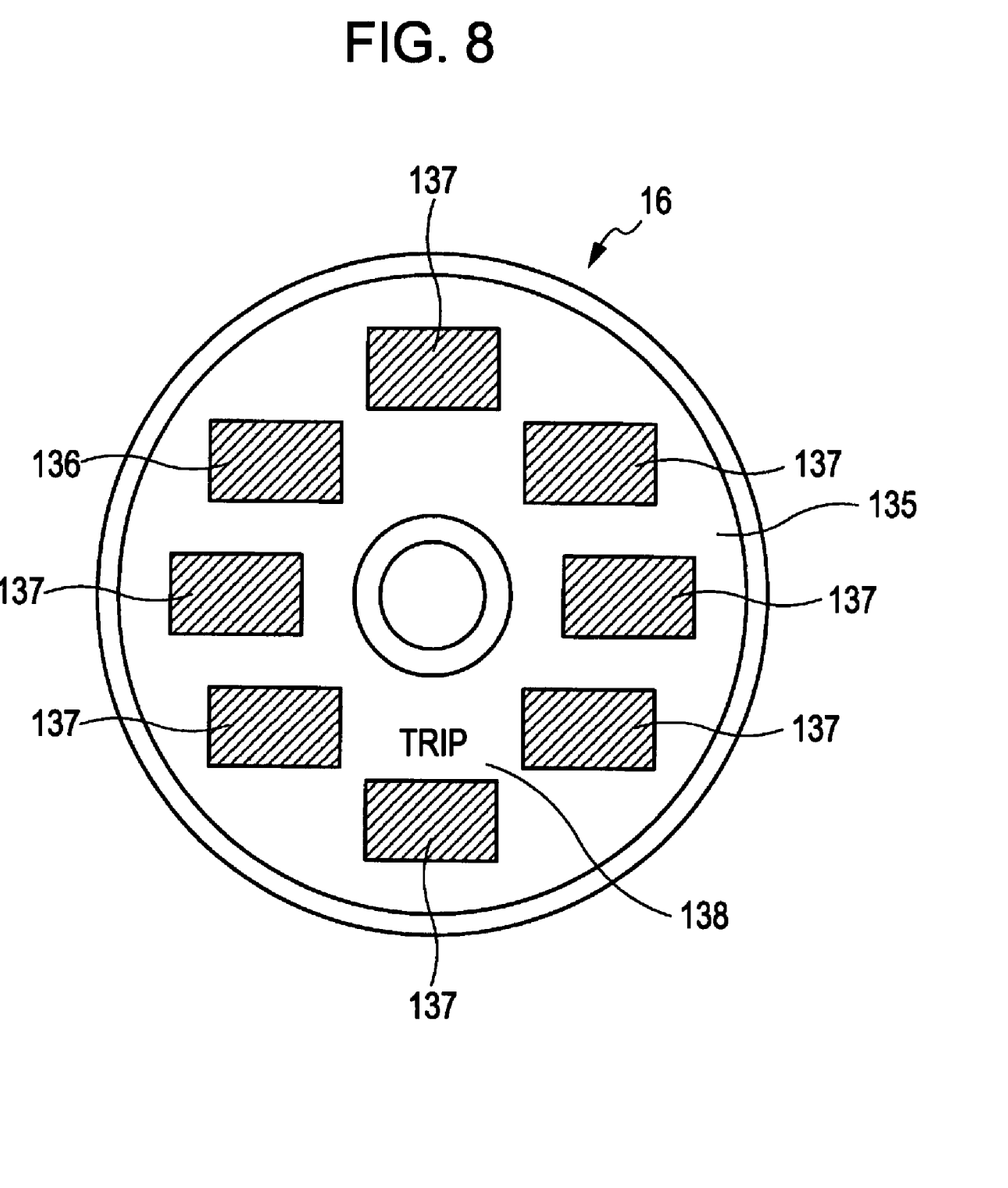
FIG. 8 is a plan view of a printed label of an optical disk according to the embodiment.

The images shown in FIG. 8 are printed on the basis of the main image data stored in the image files and the category display name or identifier used to edit the manifests. More specifically, the main image data and the category display name are allocated to areas determined by a template stored in advance in the flash memory 21, and, as a result, image data is generated. On the basis of the generated image data, the print unit 8 is driven, thereby printing the images shown in FIG. 8 on the label 135 of the optical disk 16 mounted on the disk tray 5. In areas 137, images representing the image data are printed on the basis of the image data. Printed text 138 corresponds to the category display name.

In the case that the files to copy are separately copied to multiple optical disks 16, every time the printing of the label 135 of one optical disk 16 is completed, a screen image 129 is displayed on the FPD 38. While the screen image 129 is being displayed, the user can select to continue or cancel the copying of, from among the files to copy, files that have not been copied yet. When the copying of all the files to copy is completed and the printing of the label 135 of each optical disk 16 to which the files to copy have been copied is completed, a screen image 130 indicating the user of the completion is displayed on the FPD 38.

According to the embodiment, the user can associate a category with the files to be copied simply by selecting one of the introduced categories. Without entering text, the user can easily set the category of the contents of the files. Since the category associated with each file may be used in a file search using a category as a key, it becomes easier to manage the files as a result of facilitation of the category setting.

Although image files have been mainly described in the embodiment, the invention is applicable to audio files. Category groups for image files and audio files may be stored in the flash memory 21, and the user may choose the file type to process. Categories constituting a category group in accordance with the selected file type may be introduced to the user as selection options.

First Application

Categorizing many files stored in a storage medium and copying the files to another storage medium is a frequently performed operation. Such an operation is performed in the case that, for example, photographs are taken at a plurality of events by a digital camera, and, as a result, a plurality of image files are stored in one card-type flash memory 15. The image files are categorized by event and copied to one optical disk for each event or to folders for different events on one optical disk. In addition, such an operation is performed in the case that, for example, photographs of a plurality of persons are taken by a digital camera, and, as a result, a plurality of image files are stored in one card-type flash memory 15. The image files are categorized by person and copied to one optical disk for each person.

To categorize and copy files stored in a storage medium serving as a copy source, it is necessary to select, for each category, files to copy from the copy source to each storage medium serving as a copy destination. The user can easily select files to copy if files that are already copied and files that still need to be copied are indicated to the user.

It is preferable that, as long as the card-type flash memory 15 serving as the copy source is not replaced, the controller 19 hold information for managing the copy state of each file stored in the card-type flash memory 15. More specifically, for example, the file list shown in FIG. 6 includes an additional flag field for managing the copy state of each file. Each flag is turned on and off depending on whether a corresponding file is copied or not. Accordingly, the controller 19 can manage the copy state of each file.

For example, the file list having the flag field for managing the copy state of each file may be stored in the card-type flash memory 15 serving as the copy source. By referring to the file list stored in the card-type flash memory 15, the controller 19 may manage the copy state of each file.

In the case that the controller 19 manages the copy state of each file, a GUI for selecting files to copy may be constructed as follows. For example, among the image tiles 117 of the screen image 116 shown in FIG. 1, image tiles 117 corresponding to the copied image files are displayed less strikingly than the other image tiles 117. In this way, the two types of image tiles 117 can be distinguished from each other. Alternatively, for example, only the image tiles 117 corresponding to the image files that have not been copied yet may be displayed as selection options on the screen image 116 shown in FIG. 1. In this way, the user can easily select only the image files that have not been copied yet as files to copy on the screen image 116.

Second Application

One category is collectively set to multiple files. The usability is different depending on the type of process introduced to the user after the copying of the files has been completed. More specifically, assume that, for example, one category is associated with files to copy, and the files are copied to the optical disk 16. Immediately thereafter, another category may be associated with different image files, and these image files may be copied to the same optical disk 16. Alternatively, as has been described above, the optical disk 16 may be ejected from the disk slot 12, and the label 135 of the ejected optical disk 16 may be printed. In the latter case, a GUI for guiding the user to copy data and a GUI for guiding the user to print the label 135 are continuously presented on a category basis. As a result, the user takes actions on a category basis in response to the GUIs. These actions taken by the user are those taken for one optical disk 16. Therefore, the user need not pay attention to multiple optical disks 16. In contrast, in the case that files associated with different categories are continuously copied to multiple optical disks 16, and then the labels 135 of the optical disks 16 are continuously printed, the user must manage which of the files are copied to which of the optical disks 16 until the user instructs the MFP 1 to print the labels 135. To alleviate such a management burden on the user, as has been described above, it is preferable that the copying of files and the printing of the label 135 be continuously performed for each category.

Other Embodiments

The invention is not limited to the above embodiment, and the invention can be implemented in various embodiments without departing from the scope of the invention. For example, the invention is applicable to a portable storage device containing a hard disk for storing many image files, a portable phone terminal containing a digital camera, and an electronic apparatus such as a PDA having difficulty in entering text. Accordingly, even using these portable electronic apparatuses, metadata indicating the contents of files can be associated with the files.

What is claimed is:

1. A file management apparatus comprising:
 a first non-volatile storage medium that holds a metadata group including a plurality of pieces of metadata corresponding to a predetermined file type;
 a detector that detects a file of the predetermined file type;
 a metadata guide unit that introduces, as selection options, the plurality of pieces of metadata included in the metadata group corresponding to the predetermined file type of the detected file;
 a metadata selection unit that accepts selection of at least one piece of the introduced metadata;
 a file guide unit that introduces detected files as selection options;
 a file selection unit that accepts selection of at least one of the introduced files;

a management data storage unit that stores the selected metadata in association with the detected file in a second non-volatile storage medium in which the detected file is stored;

a copy unit that copies the selected file to the second non-volatile storage medium;

a print control unit that controls printing on a label of the second non-volatile storage medium;

a judgment unit that judges whether a separate copy is necessary; and a guide unit that displays a message to allow users to put the second non-volatile storage medium on a tray;

wherein the management data storage unit stores the selected metadata in the second non-volatile storage medium that is inserted in a disk slot;

the copy unit that separates target files and copies target files to a plurality of the second non-volatile storage media when the judgment unit judges that a separate copy is necessary;

the print control unit prints an image based on the target files copied to the second nonvolatile storage medium;

the judgment unit judges that a separate copy is necessary when the second non-volatile storage medium has insufficient capacity, or that the separate copy is unnecessary when the second non-volatile storage medium has sufficient capacity; and the guide unit displays the message when the judgment unit judges that the separate copy is necessary and a copy process is interrupted after the copy process is completed to one of the second non-volatile storage media or to all of the target files; and wherein the file guide unit introduces all the detected files as selection options in the case that the files are to be introduced as selection options for the first time after the file management apparatus has entered a predetermined mode, and, in the case that the files are to be introduced as selection options for the second time and onward after the file management apparatus has entered the predetermined mode, the file guide unit introduces a file that has not been stored in the second non-volatile storage medium after the file management apparatus has entered the predetermined mode as a selection option.

2. The file management apparatus according to claim 1, wherein the first non-volatile storage medium holds a plurality of metadata groups corresponding to different file types.

3. The file management apparatus according to claim 1, wherein the management data storage unit stores the selected metadata in association with the detected file in the second non-volatile storage medium by editing a metafile for managing reference to files and corresponding metadata.

4. The file management apparatus according to claim 3, wherein the management data storage unit describes the metafile in Extensible Markup Language.

5. The file management apparatus according to claim 1, wherein, every time one piece of metadata is selected, the copy unit copies the selected file to the second non-volatile storage medium.

6. A file management method comprising:

detecting a file of a file type corresponding to a metadata group held in a first non-volatile storage medium;

introducing, as selection options, a plurality of pieces of metadata included in the metadata group corresponding to the file type of the detected file;

accepting selection of at least one of the introduced metadata; and storing the selected metadata in association with the detected file in a second non-volatile storage medium in which the detected file is stored copying a selected file to the second non-volatile storage medium;

printing on a label of the second non-volatile storage medium;

judging whether a separate copy is necessary; and displaying a message to allow users to put the second non-volatile storage medium on a tray;

wherein the step of storing the selected metadata stores the selected metadata in the second nonvolatile storage medium that is inserted in a disk slot;

the step of copying the selected files further separates target files and copies target files to a plurality of the second non-volatile storage media when the judgment unit judges that a separate copy is necessary;

the step of printing prints an image based on the target files copied to the second nonvolatile storage medium;

the step of judging judges that a separate copy is necessary when the second non-volatile storage medium has insufficient capacity, or that the separate copy is unnecessary when the second non-volatile storage medium has sufficient capacity; and the step of displaying displays the message when the judgment unit judges that the separate copy is necessary and a copy process is interrupted after the copy process is completed to one of the second non-volatile storage media or to all of the target files;

wherein the step of introducing, introduces all the detected files as selection options in the case that the files are to be introduced as selection options for the first time after the file management method has entered a predetermined mode, and, in the case that the files are to be introduced as selection options for the second time and onward after the file management method has entered the predetermined mode, the step of introducing introduces a file that has not been stored in the second non-volatile storage medium after the file management method has entered the predetermined mode as a selection option.

7. A file management program allowing a computer to function as:

a detector that detects a file of a file type corresponding to a metadata group held in a first non-volatile storage medium;

a metadata guide unit that introduces, as selection options, a plurality of pieces of metadata included in the metadata group corresponding to the file type of the detected file;

a metadata selection unit that accepts selection of at least one piece of the introduced metadata;

a file guide unit that introduces detected files as selection options; a file selection unit that accepts selection of at least one of the introduced files;

a management data storage unit that stores the selected metadata in association with the detected file in a second non-volatile storage medium in which the detected file is stored;

a copy unit that copies a selected file to the second non-volatile storage medium;

a print control unit that controls printing on a label of the second non-volatile storage medium;

a judgment unit that judges whether a separate copy is necessary; and a guide unit that displays a message to allow users to put the second non-volatile storage medium on a tray;

wherein
the management data storage unit stores the selected metadata in the second non-volatile storage medium that is inserted in a disk slot;
the copy unit that separates target files and copies target files to a plurality of the second non-volatile storage media when the judgment unit judges that a separate copy is necessary;
the print control unit prints an image based on the target files copied to the second nonvolatile storage medium;
the judgment unit judges that a separate copy is necessary when the second non-volatile storage medium has insufficient capacity, or that the separate copy is unnecessary when the second non-volatile storage medium has sufficient capacity; and
the guide unit displays the message when the judgment unit judges that the separate copy is necessary and a copy process is interrupted after the copy process is completed to one of the second non-volatile storage media or to all of the target files
wherein the file guide unit introduces all the detected files as selection options in the case that the files are to be introduced as selection options for the first time after the file management program has entered a predetermined mode, and, in the case that the files are to be introduced as selection options for the second time and onward after the file management program has entered the predetermined mode, the file guide unit introduces a file that has not been stored in the second non-volatile storage medium after the file management program has entered the predetermined mode as a selection option.

* * * * *